United States Patent Office 3,060,148
Patented Oct. 23, 1962

3,060,148
LOW VISCOSITY METHYL METHACRYLATE COATING COMPOSITION CONTAINING HIGH VISCOSITY METHYL METHACRYLATE POLYMER
John L. Evans, Flushing, and John D. Pickens and James H. Williamson, Flint, Mich., assignors to E. I. du Pont de Nemours and Company, Wilmington, Del., a corporation of Delaware
No Drawing. Filed July 29, 1958, Ser. No. 751,612
5 Claims. (Cl. 260—45.5)

This invention relates to liquid coating compositions. More particularly it relates to coating compositions or lacquers of improved spraying and coating characteristics based on certain relatively low viscosity polymers of methyl methacrylate as essential film forming constituents and modified with a small amount of relatively high viscosity polymers of methyl methacrylate.

Dry films or coatings obtained from the application of liquid coating compositions employing a polymer of methyl methacrylate as the principal film forming constituent are known to have outstanding durability and gloss retention. Coating compositions of this kind, sometimes referred to hereinafter as methyl methacrylate lacquers, have been especially adapted for spray application and have been put to large scale use in the coating of automobile bodies to give unusually durable and high gloss topcoats. These sprayable methyl methacrylate lacquers are particularly characterized by containing as an essential film former a polymer of methyl methacrylate having a relative viscosity of about 1.117 to 1.196, determined as described hereinafter.

In preparing practical, sprayable methyl methacrylate lacquers it has been found necessary heretofore to use extreme care to provide a solvent mixture for the lacquer which has a proper balance of properties. Factors such as volatility and solvency for the polymer of methyl methacrylate are characteristics of the solvent mixtures that have been important.

Generally speaking, there is a preference for the use of relatively low boiling organic liquids as solvents in making coating compositions because they are ordinarily less expensive than high boiling solvents and, as in the case of methyl methacrylate polymers, they are ordinarily better solvents for the film former. Unfortunately, the use of low boiling solvent, or too much of such solvent, has not been practical in making sprayable methyl methacrylate lacquers because the resulting lacquers give what is known in the art as too dry a coating and a resulting uneven and unsatisfactory finish. It has been necessary therefore to include in the solvent mixture for sprayable methyl methacrylate lacquers relatively large amounts of high boiling solvents. This introduces undesirable characteristics. Such high boiling solvents generally cost more, they do not dissolve as much methyl methacrylate polymer and therefore less solids can be applied in a given coat and the resulting coatings are slower drying.

Even those sprayable methyl methacrylate lacquers used heretofore which have the best balance of properties leave something to be desired in application properties. For example overspray on a surface being coated tends to form a rough surface; it does not, as the applicators say, "melt in." Thus, if one-half of the top of an automobile hood is spray coated on an assembly line, for example, and the other half is spray coated just a little later, the overspray from the first half causes an unevenness on the adjacent area when the second half is coated; and the overspray from the second half coating causes a roughness on the surface of the adjacent first-half coating. Fortunately, this is not usually serious if the coating is to be baked shortly afterwards, for the overspray ordinarily melts-in in the baking step. The problem is a serious one however, and the roughness often remains, in touch-up or refinishing operations where the application and baking techniques may not be so carefully standardized or controlled, or where lower drying temperatures are used, or air drying is relied upon rather than baking.

We have found that the aforesaid difficulties with respect to obtaining satisfactorily wet spray coatings and melt in of overspray are overcome or greatly minimized, while at the same time making possible the use of lower boiling and hence ordinarily more economical and better solvents for the polymer, by including in the methyl methacrylate lacquer a very small amount, specifically from about 0.02 to 0.5 percent based on the weight of the lacquer of a polymer of methyl methacrylate having a relative viscosity of at least 3.0.

The polymers of methyl methacrylate suitable for use as the essential film forming constituent in the compositions of this invention are those having a relative viscosity of about 1.117 to 1.196 as indicated above, and more preferably of about 1.148 to 1.183; and the polymers of methyl methacrylate suitable for use as the modifying component in the compositions of the invention are those having a relative viscosity of at least 3.0, more preferably 5.0, and most preferably 6.0 to 9.0.

The term "relative viscosity" as used herein in reference to polymers of methyl methacrylate employed in the compositions of the invention is the value obtained by dividing the efflux time of a solution, A, of the polymer of methyl methacrylate by the efflux time of the solvent, B, used in said solution, the efflux times being measured in accordance with the procedure of ASTM–D–445–46T, Method B, using as polymer solution A, a solution of 0.25 gram of the polymer of methyl methacrylate being tested in 50 cc. of ethylene dichloride, and as the solvent B, ethylene dichloride. The efflux times are determined at 25° C. in a standard apparatus currently marketed under the designation of a Modified Ostwald Viscosimeter, Series 50.

The polymers of methyl methacrylate useful in making the compositions of the invention are either homopolymers of methyl methacrylate or copolymers with minor amounts, for example, in the order of 2 to 25 percent by weight of another material copolymerizable therewith, for instance acrylic acid, methacrylic acid, the 1 to 4 carbon alkyl (i.e. methyl to butyl) esters of acrylic acid, the 2 to 4 carbon alkyl (i.e. ethyl propyl and butyl) esters of methacrylic acid, vinyl acetate, acrylonitrile and styrene. A preferred copolymer contains about 98 percent of methyl methacrylate and two percent methacrylic acid. Thus, the term "polymer of methyl methacrylate" and related terms as used herein refer to such homopolymers and copolymers as well as mixtures of homopolymers, mixtures of copolymers and mixtures containing both homopolymer and copolymer.

Polymers of methyl methacrylate for use as the essential film forming component in the compositions of the invention can be prepared according to well-known methods by polymerizing methyl methacrylate monomer, with or without another monomer copolymerizable therewith, either in bulk, in solution, or in granular form to produce products having the required relative viscosity. A preferred method is solution polymerization in which, for example suitable proportions of methyl methacrylate monomer, catalyst and solvent are heated for about 2 to 9 hours under reflux conditions while agitating. Methyl methacrylate polymers having relative viscosity within the range required for the essential film forming component of the compositions of the invention can be made according to this method using the amounts and conditions indicated in Table I, in which all ingredients are by weight.

TABLE I

*Methyl Methacrylate Polymers*

| Relative Viscosity | Molecular Weight | Methyl Methacrylate | Solvent | | Catalyst | Temp., °C. | Percent Conversion to Polymer | Reaction Time, Hours |
| --- | --- | --- | --- | --- | --- | --- | --- | --- |
| | | | Toluene | Acetone | | | | |
| 1.117 | 55,000 | 40 | 42 | 18 | 0.362 benzoyl peroxide | 90 | 93 | 9 |
| 1.142 | 70,000 | 40 | 42 | 18 | 0.28 azo [1] | 130 | 65 | 9 |
| 1.147 | 73,000 | 50 | 8 | 42 | 0.3025 benzoyl peroxide | 92 | 99 | 6 |
| 1.154 | | 40 | 60 | | 0.306 benzoyl peroxide | 85 | 94 | 6 |
| 1.165 | 85,000 | 50 | 35 | 15 | 0.2813 benzoyl peroxide | 92 | 99 | 6 |
| 1.170 | 88,000 | 50 | 8 | 42 | 0.27 benzoyl peroxide | 89 | 96 | 6 |
| 1.173 | 90,000 | 45 | 38.5 | 16.5 | 0.2417 benzoyl peroxide | 89 | 98 | 8 |
| 1.173 | 90,000 | 66.67 | 23.33 | 10.0 | 0.4 benzoyl peroxide | 100 | 98 | 2 |
| 1.192 | 102,000 | 62 | 26.6 | 11.4 | 0.341 benzoyl peroxide | 90 | 95 | 3 |

[1] Azo catalyst=alpha alpha' azodiisobutyronitrile.

The relatively high viscosity polymers of methyl methacrylate which are used in small amount as modifiers in the compositions of the invention can be suitably made by practice of the well-known casting method used for obtaining poly(methyl methacrylate) sheet products such as those currently sold by E. I. du Pont de Nemours and Company under the proprietary name of "Lucite" acrylic resin sheet and by Rohm and Haas Company as "Plexiglas" acrylic resin sheet. Such methods are described for example in Schildknecht "Vinyl and Related Polymers," chapter 4, in the section entitled "Polymerization of Methyl Methacrylate in Castings," pages 197–203 (John Wiley & Sons, 1952); also in De Bell et al. "German Plastics Practice" (De Bell and Richardson, 1946), chapter VI, pages 120–124; and many U.S. patents, including Marks, U.S. 2,369,593.

The coating compositions or lacquers, which terms are used herein synonymously to refer to liquid coating compositions suitable for application to a substrate, will contain, in addition to the relatively low and high methyl methacrylate polymer components described above, other materials which are conventionally used in making lacquers, such as a solvent and, unless a clear coating is desired, a pigment; and they can also contain conventional modifiers for coating compositions such as plasticizers, inhibitors, dispersing agents, flow control agents and the like.

The various organic liquids commonly used in coating compositions such as the alphatic, cycloaliphatic, and aromatic hydrocarbons, esters, ethers, ketones and alcohols can be used singly or in combinations in making the coating compositions of this invention. Illustrative of relatively low boiling liquids which can be used as solvents or solvent components are acetone, methyl ethyl ketone, ethyl acetate, ethyl alcohol, isopropanol, ethylene dichloride, methyl acetate, toluene, cyclohexane, benzene, hexane, butanol and low boiling petroleum naphtha. Illustrative of the relatively high boiling liquids which can be used as solvents or solvent components in making the coating compositions of the invention are ethylene glycol monoethyl ether acetate, butyl lactate, diacetone alcohol, diisobutyl ketone, cyclohexanone, ethylene glycol monobutyl ether, cyclohexanol, furfural, high boiling petroleum naphtha, xylene, methyl amyl acetate, high solvency petroleum naphtha, and amyl alcohol.

Examples of the great variety of pigments which can be used in making the lacquers of the invention are the iron blues, organic reds and maroons, silica, talc, china clay, and metallic oxides, silicates, chromates, sulfides and sulfates. The pigments are, of course, used in proportions normally used in lacquers. Thus the amount of pigment used is sufficient to provide the desired hiding power, and will vary, for example, from about 2%, based on the weight of the methyl methacrylate polymer film former, for light, high hiding pigments such as carbon black or aluminum, to about 100%, on the same basis, for heavy, low-hiding pigments such as lead chromate.

Any of the many known plasticizers for polymers for methyl methacrylate can be employed in compositions of the invention. The preferred plasticizer from the standpoint of best overall balance of properties is benzyl butyl phthalate. Other plasticizers which aid in providing dry films having especially desirable properties are triphenyl phosphate, 2-ethyl hexyl benzyl phthalate and dicyclohexyl phthalate. Other known plasticizers for polymers of methyl methacrylate which can be used include diallyl phthalate, dibenzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di-2-ethyl hexyl ester of hexamethylene diphthalate, and di(methylcyclohexyl) phthalate. In general, the plasticizers are used in amounts of about 10 to 50% by weight based on the weight of the essential film forming polymer of methyl methacrylate.

Other conventional modifying agents for coating compositions can, if desired, be incorporated to alter the manufacturing, storage, application or service properties of the lacquers of the invention. Illustrative of such modifying agents are soya lecithin, silicone fluids, triethanolamine, fatty oil acids and glyceride oil derivatives.

While the essential film forming component in the lacquers of the invention is a polymer of methyl methacrylate having a relative viscosity of about 1.117 to 1.196, it will be understood that minor proportions of other well-known film forming constituents which are compatible therewith can be incorporated in the lacquers to effect some variation such as a degree of hardness or flexibility in the dried film. Examples of such film forming materials are polymers and co-polymers of vinyl esters, polymers and copolymers of acrylic esters other than polymers of methyl methacrylate, oil-modified alkyd resins and natural resins.

The various ingredients can be brought together to form the compositions of this invention according to conventional methods for preparing organic coating compositions. Pigmented coating compositions of the invention can, for example, be prepared by dispersing the pigment in the polymer of methyl methacrylate film former by means of conventional paint grinding equipment. The solvents, diluents, plasticizers, relatively high viscosity polymer of methyl methacrylate modifier, and other modifiers used can be incorporated before, during, or after the grinding operation.

It is common practice in the coating art to prepare liquid coating compositions on a commercial basis in a highly concentrated form and this practice can be followed with respect to the lacquers of this invention. In comparison with the same composition in a thinned or diluted form ready for application, the concentrated form is more resistant to pigment settling during storage, is more economical to store and ship because less weight and space are involved and is in a more adaptable condition for the addition of thinning and other modifying materials by the ultimate user to adjust the final composition to his own liking. Therefore, the concentrated coating compositions from which the sprayable lacquers of this invention can be prepared by merely admixing with organic liquid thinners form a part of this invention, provided, of course, that the modifying polymer of methyl methacrylate having a relative viscosity of at least 3.0 is present in sufficient amount to provide from about 0.02 to 0.5% by weight of that polymer, based on the weight of the ready-to-spray coating composition made by diluting the concentrated coating composition.

The maximum degree of concentration of the compositions of the invention, i.e., the maximum nonvolatile solids content, is limited only by the maximum consistency which can be conveniently handled by the manufacturer and the ultimate user. While concentrated lacquers having a nonvolatile solids content of 75% by weight, or even higher, can be prepared, the normal concentration is usually between 30% and 60%. The minimum concentration is obviously the most dilute one that any user finds practical for his particular application conditions; ordinarily the concentration of nonvolatile solids will not be below about 10% by weight.

As pointed out heretofore the amount of polymer of methyl methacrylate having a relative viscosity of at least 3.0 which is used as a modifier in the compositions of the invention is from 0.02 to 0.5%, and more preferably from about 0.02 to 0.2% based on the weight of the coating composition at spray dilution, that is based on the weight of the composition in the ready-to-spray form. Thus, if this relatively high viscosity modifier is incorporated in a concentrate containing 40% by weight nonvolatiles which is to be diluted to 20% by weight nonvolatiles for application as a spray, then the quantities of the relatively high viscosity polymer of methyl methacrylate in the concentrate will be double those specified in this paragraph for the sprayable composition. Of course, it is not necessary in the practice of this invention that the relatively high viscosity polymer of methyl methacrylate used as a modifier be included in the concentrated coating composition of the kind normally sold for subsequent dilution by the spray applicator. Thus, the relatively high viscosity polymer can be added subsequently, for example, along with or in solution in the organic liquid or liquids, i.e., the thinner, used to dilute or thin the concentrate to the desired concentration for spraying, in which case the thinner will ordinarily contain from about 0.03 to 1.4% by weight of said high viscosity polymer.

While the particular relative viscosity of the polymer of methyl methacrylate modifier used in making the coating compositions of the invention can be varied widely so long as it is at least 3.0, it is preferred as mentioned heretofore that the relative viscosity be in the range of about 5–9, and in general it will be found more advantageous to use the higher viscosity polymers in the lower end of the specified concentration range and the lower viscosity polymers in the higher end of the concentration range.

For spray applications the preferred coating compositions in ready-to-spray form contain from about 5% to 20% by weight of the essential film former, the polymer of methyl methacrylate having a relative viscosity of 1.117 to 1.196. As polymers of methyl methacrylate having increasing relative viscosity within said relative viscosity range are used, better spray properties are realized if the concentration of such polymers in the ready-to-spray compositions is reduced. For example, using a polymer having a relative viscosity of 1.196, the maximum concentration of such polymer in the sprayable composition preferably should not exceed about 12%; with 1.153 relative viscosity polymer, the maximum spray concentration is preferably kept below about 16.5%; and with polymers at the low end of the relative viscosity range, i.e. about 1.117, the maximum concentration is about 20%.

The liquid coating compositions of the invention can be applied to a variety of substrates, for example, wood, glass and metal, by any of the usual application methods such as spraying, dipping and brushing. The benefits of the invention are realized most fully however when the compositions are applied by spraying, rather than dipping or brushing, since the compositions provide a wetter spray with subsequent more rapid and uniform coverage, and better melt in of overspray than do compositions which are otherwise the same except that they do not contain the small quantity of relatively high viscosity polymer of methyl methacrylate which is an essential constituent of the compositions of this invention. The liquid coating compositions so applied can be air dried or alternatively the drying period can be minimized by baking. Air drying to a stage which permits handling usually requires 4–25 hours. Baking at 150–200° F. normally reduces the drying time to 30–60 minutes and baking at 250–300° F. reduces the time to 5–20 minutes. The resulting dry coatings or films can be rubbed or polished in accordance with conventional techniques if desired to improve smoothness or apparent gloss, or both.

The liquid coating compositions of this invention are especially useful for coating articles which are subjected to the weather, particularly where it is required to protect the substrate and to retain a pleasing and decorative appearance for long periods, and which are sometimes required to be wholly or partly refinished. For these reasons the compositions are particularly useful as topcoat finishes for application to suitably primed automobile bodies and sheet metal parts.

In order that the invention may be better understood, the following examples illustrating compositions of the invention, their preparation, application and use are given in addition to the examples already given above. Parts and percentages are by weight unless otherwise indicated.

EXAMPLE 1

A lacquer concentrate, composition A below, is diluted to a spray concentration with composition B below.

| Composition A: | Percent |
|---|---|
| Poly(methyl methacrylate), relative viscosity=1.17 | 16.87 |
| Nitrocellulose, viscosity grade 350 seconds | 0.82 |
| Aluminum pigment, flake | 1.16 |
| Trace amounts of white, blue, black, and colloidal hydrous iron oxide pigments for tinting | 0.17 |
| Dimethyl dioctodecyl ammonium salt of bentonite | 1.44 |
| Acetone | 34.60 |
| Toluene | 22.40 |
| Xylene | 7.40 |
| Ethylene glycol monoethylether acetate | 7.31 |
| Ethyl alcohol | 0.34 |
| Naphtha | 0.31 |
| Mineral spirits | 0.31 |
| Benzyl butyl phthalate | 6.87 |
| | 100.00 |

| Composition B: | |
|---|---|
| Poly(methyl methacrylate), relative viscosity=8.27 | 0.05 |
| Acetone | 30.65 |
| Xylene | 29.70 |
| Hexane | 19.80 |
| Ethylene glycol monoethylether acetate | 14.85 |
| n-Butyl alcohol | 4.95 |
| | 100.00 |

Composition B is added to composition A with agitation until the resulting mix has a viscosity of 34 seconds using a #1 Zahn cup. This provides a sprayable coating composition containing about 14.9% nonvolatiles, about 9.0% methyl methacrylate polymer of 1.17 relative viscosity and about 0.023% of methyl methacrylate polymer having 8.27 relative viscosity.

The coating composition of this example is a grayish silver colored product. It is sprayed on to a metal surface which has previously been coated with a conventional auto body undercoat composition to give a lacquer coating of about 2.2 mils thickness when dried. The sprayed coating has a desirable wetness as applied and levels on the substrate to give a uniform smooth coating. Drying of the coating at 200° F. for thirty minutes provides a hard, durable, attractive protective and decorative topcoat. In contrast, the coating composition identical with the composition of this example, except for the omission of the high viscosity methyl methacrylate polymer (i.e., the polymer having relative viscosity of 8.27), has poor spray characteristics providing what is known as a dry spray which does not level well and gives a rough, relatively dull and generally unattractive finish.

EXAMPLE 2

A sprayable lacquer is made by thinning composition A below with composition B below.

Composition A:

| | Percent |
|---|---|
| Poly(methyl methacrylate), relative viscosity=1.17 | 17.95 |
| Nitrocellulose, viscosity grade 350 seconds | 0.67 |
| Aluminum pigment, flake | 0.72 |
| Orange pigment dyestuff | 0.54 |
| Trace amounts of white, black, violet and colloidal hydrous iron oxide pigments for tinting | 0.15 |
| Dimethyl dioctodecyl ammonium salt of bentonite | 1.53 |
| Acetone | 30.45 |
| Toluene | 23.55 |
| Xylene | 10.45 |
| Ethylene glycol monoethylether acetate | 6.02 |
| Ethyl alcohol | 0.28 |
| Naphtha | 0.19 |
| Mineral spirits | 0.19 |
| Benzyl butyl phthalate | 7.31 |
| | 100.00 |

Composition B:

| | |
|---|---|
| Poly(methyl methacrylate), relative viscosity=8.27 | 0.04 |
| Acetone | 30.52 |
| Xylene | 29.76 |
| Hexane | 19.84 |
| Ethylene glycol monoethylether acetate | 14.88 |
| n-Butyl alcohol | 4.96 |
| | 100.00 |

Composition B is added to composition A with agitation until the viscosity of the resulting mix is 34 seconds using a #1 Zahn cup. It contains about 17% nonvolatiles, about 10% of the relatively low viscosity methyl methacrylate polymer, and about 0.017% of the relatively high viscosity methyl methacrylate polymer.

The coating composition of this example has an old rose color. It is sprayed at an atomizing air pressure of about 60 pounds per square inch, using a De Vilbiss type JGA-502 spray gun fitted for suction feed and using an E tip and needle and a #30 air cap, on to a metal surface which has been previously coated with a conventional auto body undercoat to give a topcoat lacquer coating of about 2 mils thickness when dried.

The coating composition as sprayed on to the substrate has the proper wetness to flow and level ideally on the substrate to give a uniform smooth coating. In contrast, a sprayable coating composition made by thinning composition A above with thinner like that of composition B but omitting the high viscosity methyl methacrylate polymer of composition B to a viscosity of 33 seconds as measured by a #1 Zahn cup gives a relatively dry, rough spray coating which does not level well.

EXAMPLE 3

A lacquer is made by thorough mixing of the following two compositions.

Composition A:

| | Percent |
|---|---|
| Poly(methyl methacrylate), relative viscosity=1.17 | 13.31 |
| Copolymer of 98 parts methyl methacrylate and 2 parts methacrylic acid, relative viscosity=1.55 | 7.08 |
| Titanium dioxide pigment | 14.47 |
| Brown pigment | 0.26 |
| Dimethyl dioctodecyl ammonium salt of bentonite | 1.73 |
| Xylene | 23.58 |
| Toluene | 21.44 |
| Acetone | 9.80 |
| Benzyl butyl phthalate | 8.33 |
| | 100.00 |

Composition B:

| | |
|---|---|
| Poly(methyl methacrylate), relative viscosity=8.27 | 0.1 |
| Acetone | 31.3 |
| Xylene | 29.4 |
| Hexane | 19.6 |
| Ethylene glycol monoethylether acetate | 14.7 |
| n-Butyl alcohol | 4.9 |
| | 100.0 |

The above coating composition has a viscosity of 35.5 seconds using a #1 Zahn cup. It contains about 22% nonvolatiles, about 20.4% of the low viscosity methyl methacrylate polymer, and about .05% of the high viscosity methyl methacrylate polymer.

The composition of this example has an ivory color. It is sprayed at an atomizing air pressure of about 60 pounds per square inch, using a De Vilbiss type JGA-502 spray gun fitted for suction feed and using an E tip and needle and a #30 air cap, on to metal surfaces which have been coated with primer or surfacer to give a lacquer coating of about 1.4 mils thickness when dried at 200° F. for thirty minutes. The liquid coating as applied has desirable wetness and levels well. The dry coating is extremely durable and smooth.

Surprisingly, while the coating composition of this example gives an apparently much wetter spray coating than does a composition which is identical except for the omission of the high viscosity methyl methacrylate polymer modifier, it dries to the same hardness as a film of the same thickness obtained from the unmodified composition. Specifically after drying at 200° F. for thirty minutes, both the coating obtained using the composition of this example and one obtained using an identical composition except for the omission of the high viscosity methyl methacrylate polymer modifier have a hardness of 6.2 Knoop units (ASTM specification D-1474-57T) using a Tukon tester (described in booklet DH-114 of the Wilson Mechanical Instrument Co.).

The foregoing detailed description has been given for clearness of understanding only and no unnecessary limitations are to be understood therefrom. The invention is not limited to the exact details shown and described for obvious modifications will appear to those skilled in the art and any departure from the description herein which conforms to the principles of the invention is intended to be included in the scope of the claims below.

We claim:

1. A method for modifying the spraying and coating characteristics of a liquid coating composition containing in solution in an organic solvent a polymer of methyl methacrylate having a relative viscosity of about 1.117 to 1.196 as an essential film-forming constituent, which comprises including in said composition from about 0.02 to 0.5% by weight, based on the weight of the coating composition at spray dilution, of a polymer of methyl methacrylate having a relative viscosity of at least 3.0, each of said polymers of methacrylate being from the group consisting of homopolymers of methyl methacrylate, and copolymers of methyl methacrylate with a member of the group consisting of acrylic acid, methacrylic acid, 1-4 carbon atom alkyl esters of acrylic acid, 2-4 carbon atom alkyl esters of methacrylic acid, vinyl acetate, acrylonitrile and styrene, said copolymers containing as least about 75% copolymerized methyl methacrylate.

2. A method for modifying the spraying and coating characteristics of a liquid coating composition containing in solution in an organic solvent a polymer of methyl methacrylate having a relative viscosity of about 1.148 to 1.183 as the principal film-forming ingredient, which comprises including in said composition from about 0.02 to 0.2% by weight, based on the weight of the coating composition at spray dilution, of a polymer of methyl methacrylate having a relative viscosity of about 6.0 to 9.0, each of said polymers of methacrylate being from the group consisting of homopolymers of methyl methacrylate, and copolymers of methyl methacrylate with a member of the group consisting of acrylic acid, methacrylic acid, 1-4 carbon atom alkyl esters of acrylic acid, 2-4 carbon atom alkyl esters of methacrylic acid, vinyl acetate, acrylonitrile and styrene, said copolymers containing at least about 75% copolymerized methyl methacrylate.

3. A liquid coating composition comprising as an essential film-forming constituent a polymer of methyl methacrylate having a relative viscosity of about 1.117 to 1.196 and from about 0.02 to 0.5% by weight, based on the weight of the coating composition at a concentration adapted for application as a spray, of a polymer of methyl methacrylate having a relative viscosity of at least 3.0, each of said polymers of methacrylate being from the group consisting of homopolymers of methyl methacrylate, and copolymers of methyl methacrylate with a member of the group consisting of acrylic acid, methacrylic acid, 1-4 carbon atom alkyl esters of acrylic acid, 2-4 carbon atom alkyl esters of methacrylic acid, vinyl acetate, acrylonitrile and styrene, said copolymers containing at least about 75% copolymerized methyl methacrylate.

4. A liquid coating composition comprising as an essential film-forming constituent a polymer of methyl methacrylate having a relative viscosity of about 1.148 to 1.183 and from about 0.02 to 0.2% by weight, based on the weight of the coating composition at a concentration adapted for application as a spray, of a polymer of methyl methacrylate having a relative viscosity of about 6.0 to 9.0, each of said polymers of methacrylate being from the group consisting of homopolymers of methyl methacrylate, and copolymers of methyl methacrylate with a member of the group consisting of acrylic acid, methacrylic acid, 1-4 carbon atom alkyl esters of acrylic acid, 2-4 carbon atom alkyl esters of methacrylic acid, vinyl acetate, acrylonitrile and styrene, said copolymers containing at least about 75% copolymerized methyl methacrylate.

5. A liquid coating composition comprising as an essential film-forming constituent a homopolymer of methyl methacrylate having a relative viscosity of about 1.117 to 1.196 and from about 0.02 to 0.5% by weight, based on the weight of the coating composition at a concentration adapted for application as a spray, of a homopolymer of methyl methacrylate having a relative viscosity of at least 3.0.

References Cited in the file of this patent

UNITED STATES PATENTS

| | | |
|---|---|---|
| 2,129,665 | Barrett et al. | Sept. 13, 1938 |
| 2,578,665 | Bjorksten et al. | Dec. 18, 1951 |
| 2,823,140 | Lowell | Feb. 11, 1958 |
| 2,868,760 | Staicopoulos | Jan. 13, 1959 |
| 2,934,509 | Crissey et al. | Apr. 26, 1960 |
| 2,940,950 | Gusman | June 14, 1960 |

UNITED STATES PATENT OFFICE
CERTIFICATE OF CORRECTION

Patent No. 3,060,148                    October 23, 1962

John L. Evans et al.

It is hereby certified that error appears in the above numbered patent requiring correction and that the said Letters Patent should read as corrected below.

Column 8, line 13, for "1.55" read -- 1.155 --.

Signed and sealed this 19th day of March 1963.

(SEAL)
Attest:

ESTON G. JOHNSON
Attesting Officer

DAVID L. LADD
Commissioner of Patents